US008813884B2

(12) United States Patent
Roos et al.

(10) Patent No.: US 8,813,884 B2
(45) Date of Patent: Aug. 26, 2014

(54) OPTIMIZATION TO REDUCE FUEL CONSUMPTION IN CHARGE DEPLETING MODE

(75) Inventors: Bryan Nathaniel Roos, West Bloomfield, MI (US); Ryan D. Martini, Wolverine Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 662 days.

(21) Appl. No.: 13/027,499

(22) Filed: Feb. 15, 2011

(65) Prior Publication Data
US 2012/0209462 A1   Aug. 16, 2012

(51) Int. Cl.
B60W 10/00  (2006.01)
B60W 20/00  (2006.01)
G06F 7/00   (2006.01)
G06F 17/00  (2006.01)

(52) U.S. Cl.
USPC ........................................ 180/65.265; 701/22

(58) Field of Classification Search
CPC ........... G06F 17/00; G06F 7/00; G06F 17/10; G06F 1/16; G06F 1/24; B60W 20/00; B60W 10/06; B60W 10/08; B60W 20/20; B60W 10/10; B60K 6/42; B60K 17/10; B60K 17/28
USPC .......... 701/22, 93; 180/65.265, 65.2, 65.275, 180/65.27; 290/40 C
See application file for complete search history.

(56) References Cited

U.S. PATENT DOCUMENTS

| | | | |
|---|---|---|---|
| 6,307,277 B1 * | 10/2001 | Tamai et al. ................. | 290/40 C |
| 6,376,927 B1 * | 4/2002 | Tamai et al. ................. | 290/40 C |
| 6,732,526 B2 * | 5/2004 | Minagawa et al. ............. | 60/706 |
| 6,819,985 B2 * | 11/2004 | Minagawa et al. ............. | 701/22 |
| 7,275,518 B1 * | 10/2007 | Gartner et al. ............ | 123/406.23 |
| 2003/0089538 A1 * | 5/2003 | Boggs et al. ................. | 180/65.2 |
| 2003/0176955 A1 * | 9/2003 | Minagawa et al. ............. | 701/22 |
| 2004/0112653 A1 * | 6/2004 | Boggs et al. ................. | 180/65.2 |
| 2006/0224282 A1 * | 10/2006 | Seo et al. ......................... | 701/22 |
| 2008/0059035 A1 * | 3/2008 | Siddiqui et al. ................. | 701/93 |
| 2008/0276913 A1 * | 11/2008 | Zubeck .......................... | 123/543 |
| 2009/0236160 A1 * | 9/2009 | Tanaka et al. ............. | 180/65.265 |
| 2010/0038158 A1 * | 2/2010 | Whitney et al. .......... | 180/65.265 |
| 2010/0179714 A1 * | 7/2010 | Tani et al. ......................... | 701/22 |
| 2010/0185351 A1 * | 7/2010 | Uchiyama et al. ............... | 701/22 |
| 2010/0305795 A1 * | 12/2010 | Kuang et al. ..................... | 701/22 |
| 2011/0029177 A1 * | 2/2011 | Yeung et al. ..................... | 701/22 |
| 2011/0166731 A1 * | 7/2011 | Kristinsson et al. ............ | 701/22 |
| 2012/0029748 A1 * | 2/2012 | Kozarekar et al. .............. | 701/22 |
| 2012/0109432 A1 * | 5/2012 | Pitsch et al. ..................... | 701/22 |

* cited by examiner

Primary Examiner — Calvin Cheung
Assistant Examiner — Luis A Martinez Borrero

(57) ABSTRACT

A powertrain includes an internal combustion engine, a motor utilizing electrical energy from an energy storage device, and a plug-in connection. A Method for controlling the powertrain includes monitoring a fuel cut mode, ceasing a fuel flow to the engine based upon the fuel cut mode, and through a period of operation including acceleration of the powertrain, providing an entirety of propelling torque to the powertrain with the electrical energy from the energy storage device based upon the fuel cut mode.

21 Claims, 4 Drawing Sheets

US 8,813,884 B2

OPTIMIZATION TO REDUCE FUEL CONSUMPTION IN CHARGE DEPLETING MODE

GOVERNMENT CONTRACT RIGHTS

The U.S. Government has a paid-up license in this invention and the right in limited circumstances to require the patent owner to license others on reasonable terms as provided for by the terms of Cooperative Agreement Number DE-FC26-08NT04386 awarded by the U.S. Department of Energy.

TECHNICAL FIELD

This disclosure is related to powertrains utilizing an electrical energy source.

BACKGROUND

The statements in this section merely provide background information related to the present disclosure and may not constitute prior art.

Powertrains can utilize a variety of energy sources to provide energy to a torque generative device of the powertrain. Electrical energy can be stored in an energy storage device and the electrical energy can be used to provide motive or propelling torque to the powertrain through the torque generative device.

Powertrains can utilize more than a single source of energy. For example, a hybrid drive powertrain can utilize electrical energy through a motor or motors and petroleum energy though a gasoline or diesel internal combustion engine. Other sources of energy are known including fuel cells and biodiesel or E85 engines. Electrical energy can be recovered through operation of the vehicle, for example, through regenerative braking. Further, electrical energy can be created and stored in the energy storage device through directly driving a motor with an engine or driving an alternator, for example, as a belt driven device. Further, the energy storage device can be charged through a plug-in connection to an infrastructure power grid.

It may be desirable that most or all of the stored electrical energy of the vehicle be utilized through the course of a travel route. In this way, a plug-in connection can be used before and after the travel route is undertaken, and a minimum of other energy sources can be utilized.

SUMMARY

A powertrain includes an internal combustion engine, a motor utilizing electrical energy from an energy storage device, and a plug-in connection. A Method for controlling the powertrain includes monitoring a fuel cut mode, ceasing a fuel flow to the engine based upon the fuel cut mode, and through a period of operation including acceleration of the powertrain, providing an entirety of propelling torque to the powertrain with the electrical energy from the energy storage device based upon the fuel cut mode.

BRIEF DESCRIPTION OF THE DRAWINGS

One or more embodiments will now be described, by way of example, with reference to the accompanying drawings, in which.

DETAILED DESCRIPTION

Figure 1:
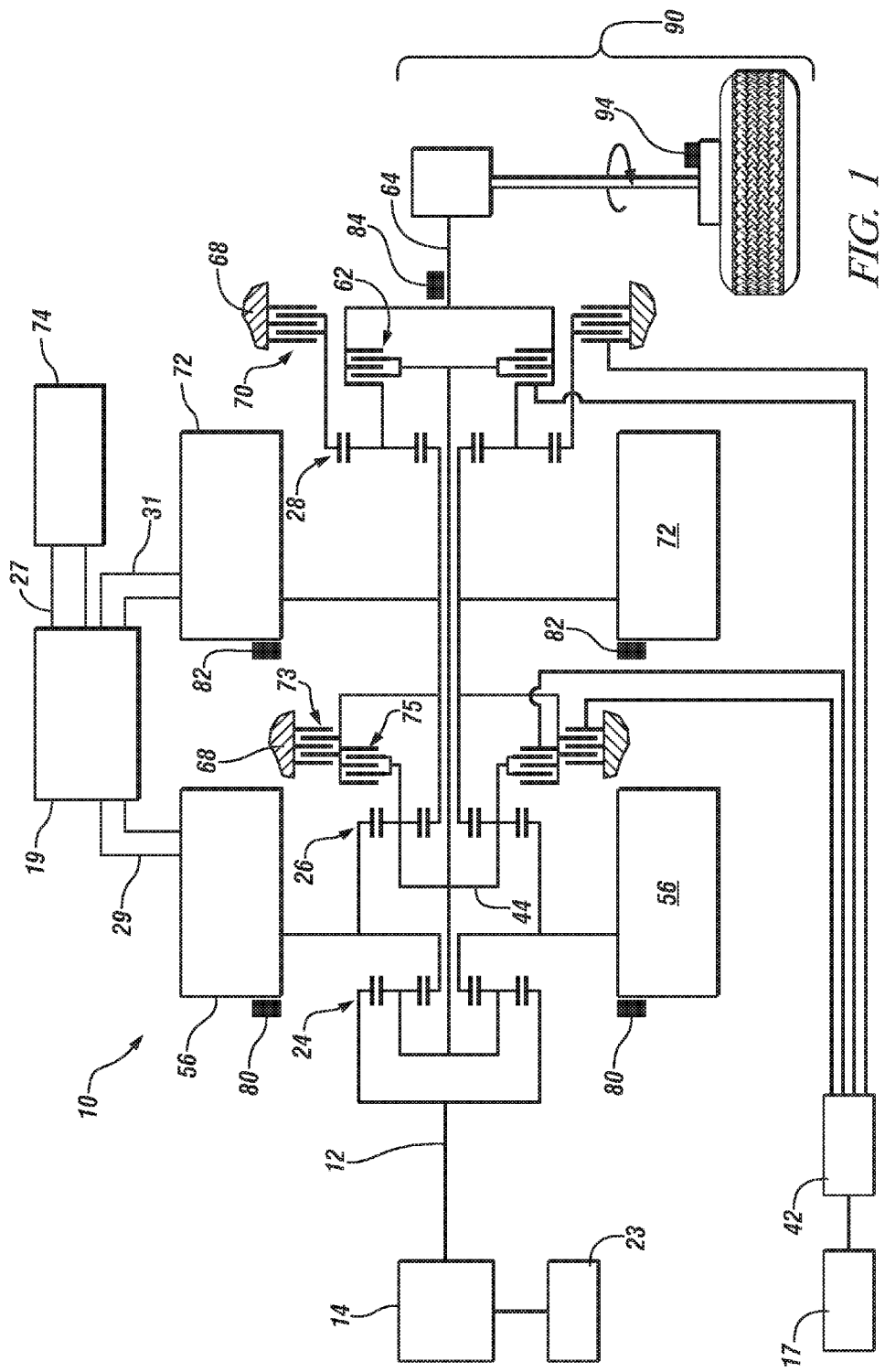
FIG. 1 illustrates an exemplary hybrid drive powertrain including an engine, transmission, driveline, control system, and hydraulic control circuit, in accordance with the present disclosure.

Referring now to the drawings, wherein the showings are for the purpose of illustrating certain exemplary embodiments only and not for the purpose of limiting the same, FIG. 1 illustrates an exemplary hybrid drive powertrain including an engine 14, transmission 10, driveline 90, control system, and hydraulic control circuit. Such an exemplary hybrid drive powertrain includes a plurality of torque generative devices operable in a powersplit mode wherein the various torque generative devices can selectively and cooperatively contribute torque to the powertrain. The transmission 10 includes an input shaft 12 having an input speed $N_I$ that is preferably driven by the internal combustion engine 14, and an output shaft 64 having an output rotational speed ($N_O$). The rotational speed of the output shaft 64 is preferably monitored using a sensing system 84.

The exemplary engine 14 includes a multi-cylinder internal combustion engine selectively operative in several states to transmit torque to the transmission via shaft 12, and can be either a spark-ignition or a compression-ignition engine. The engine 14 has a crankshaft having output speed ($N_E$) which is operatively connected to the transmission input shaft 12. The output of the engine (speed $N_E$ and torque $T_E$) can differ from transmission input speed ($N_I$) and engine input torque ($T_I$) when a torque management device is placed therebetween.

The transmission 10 utilizes three planetary gear sets 24, 26 and 28, and four torque-transmitting devices, i.e., clutches C1 70, C2 62, C3 73, and C4 75. An electro-hydraulic control system 42, preferably controlled by transmission control module (TCM) 17, is operative to control actuation and deactivation of the clutches. Clutches C2 and C4 preferably include hydraulically-actuated rotating friction clutches. Clutches C1 and C3 preferably include hydraulically-actuated stationary devices grounded to the transmission case 68. Each clutch is preferably hydraulically actuated, receiving pressurized hydraulic fluid from a pump via an electro-hydraulic control circuit.

There is a first electric machine including a motor 56, referred to as MG-A, and a second electric machine including a motor 72, referred to as MG-B, operatively connected to the transmission via the planetary gears. Each of the machines includes a stator, a rotor, and a resolver assembly 80, 82. The stator for each machine is grounded to outer transmission case 68, and includes a stator core with coiled electrical windings extending therefrom. The rotor for MG-A 56 is supported on a hub plate gear that is operably attached to output shaft 60 via carrier 26. The rotor for MG-B 72 is attached to sleeve shaft hub 66. The resolver assemblies 80, 82 are appropriately positioned and assembled on MG-A 56 and MG-B 72. Each resolver assembly 80, 82 includes a known variable reluctance device including a resolver stator, operably connected to the stator of each electric machine, and a resolver rotor, operably connected to the rotor of each electric machine. Each resolver 80, 82 includes a sensing device adapted to sense rotational position of the resolver stator relative to the resolver rotor, and identify the rotational position. Signals output from the resolvers are interpreted to provide rotational speeds for MG-A 56 and MG-B 72, referred to as $N_A$ and $N_B$. Transmission output shaft 64 is operably connected to a vehicle driveline 90 to provide motive output torque, $T_O$ to vehicle wheels. The driveline 90 includes a transfer case 96 having a known axle ratio, which transmits torque to vehicle drive wheels. Each wheel of the vehicle, including the drive wheels and driven wheels, has a wheel speed sensing system 94 including one or more speed sensing devices mounted at the wheel and adapted to measure rotational speed of the respective wheel, including right-front (RF), right-rear (RR), left-front (LF), and left-rear (LR) wheels. The output of each wheel speed sensing system 94 is monitored by a brake control module.

The transmission 10 receives input torque from the torque-generative devices, including the engine 14, and MG-A 56 and MG-B 72, referred to as ($T_I$), ($T_A$), and ($T_B$) respectively, as a result of energy conversion from fuel or electrical potential stored in an electrical energy storage device (ESD) 74. The ESD 74 is high voltage DC-coupled to transmission power inverter module (TPIM) 19 via DC transfer conductors 27. The TPIM 19 is an element of the control system. The TPIM 19 transmits electrical energy to and from MG-A 56 by transfer conductors 29, and the TPIM 19 similarly transmits electrical energy to and from MG-B 72 by transfer conductors 31. Electrical current is transmitted to and from the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality. Preferably, MG-A 56 and MG-B 72 are three-phase AC machines each having a rotor operable to rotate within a stator that is mounted on a case of the transmission. The inverters include known complementary three-phase power electronics devices.

The exemplary hybrid drive powertrain of FIG. 1 can utilize various combinations of engine 14 and motors 56 and 72 to provide torque to the powertrain. The exemplary hybrid drive powertrain can be described as a two mode hybrid, wherein two electrically variable gears states (EVT1 and EVT2) are possible. EVT1 and EVT2 utilize operation of transmission 10 and associated the planetary gear sets 24, 26, and/or 28 along with selective operation of associated clutches and motors 56 and 72 to enable a variable ratio of $N_I$ to $N_O$. An embodiment of EVT1 includes using one of motors 56 and 72 to provide torque to the powertrain to drive output shaft 64, while the engine 14 can be utilized separately to drive the other motor as a generator and provide electrical energy to the energy storage device 74. Another embodiment of EVT1 includes using one of motors 56 and 72 to provide output torque to output shaft 64 while the engine is turned off and stationary. An embodiment of EVT2 includes utilizing all of engine 14 and motors 56 and 72 to simultaneously provide torque to output shaft 64. Another exemplary embodiment of EVT2 includes utilizing one or both of motors 56 and 72 to provide torque to output shaft 64 while turning off engine 14 and allowing the engine to spin freely. In some embodiments, engine 14 can be operated to open all associated exhaust and intake valves to reduce pumping losses associated with spinning the engine while it is turned off. Another exemplary embodiment of EVT2 includes utilizing motors 56 and 72 to simultaneously provide torque to output shaft 64 while actively maintaining the engine speed equal to or near zero. Hybrid drive powertrains can take a number of embodiments, and a number of control schemes and resulting torque configurations can be achieved, and the disclosure is not intended to be limited to the exemplary embodiments provided herein.

Figure 2:
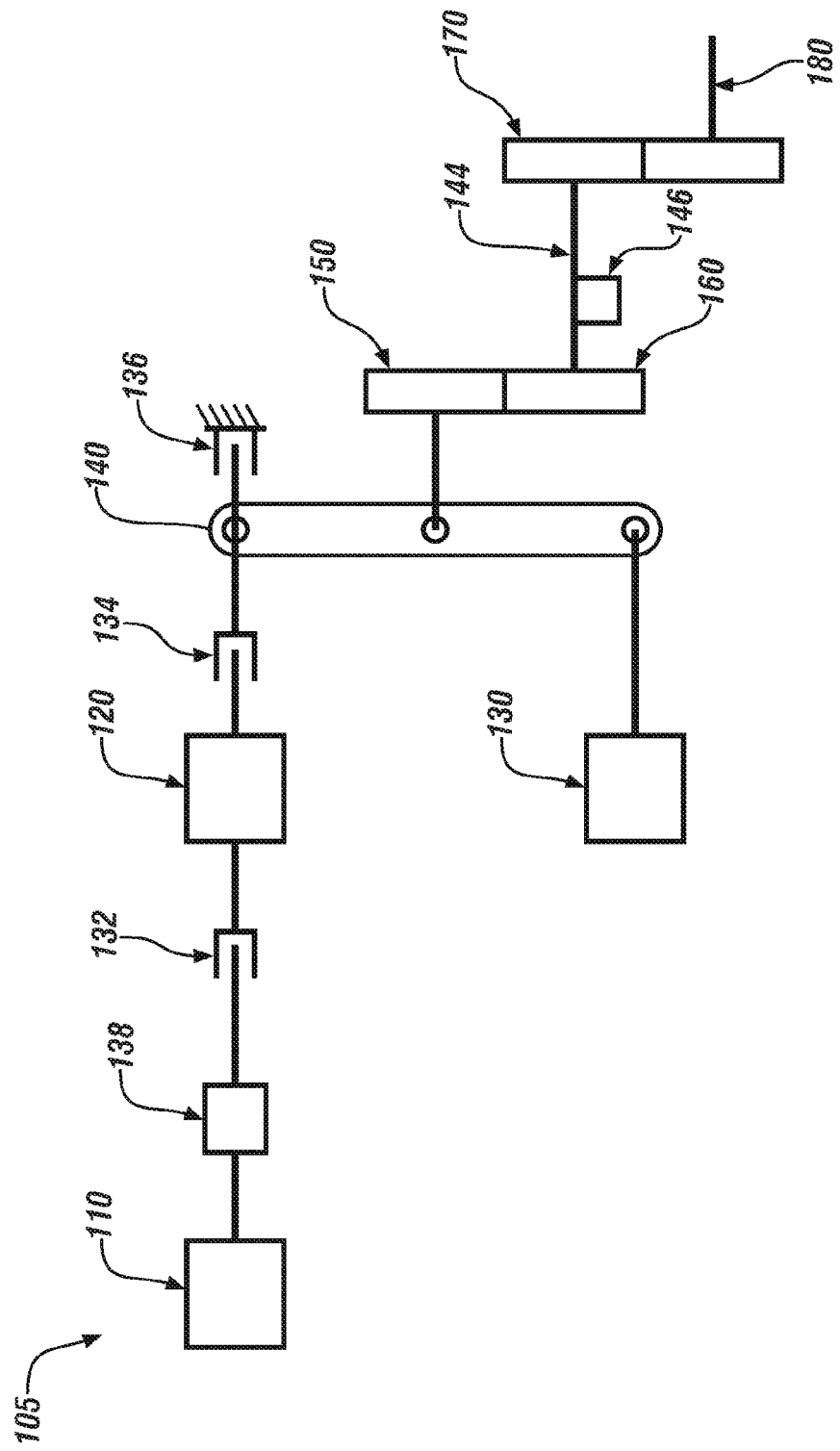
FIG. 2 illustrates depicts an exemplary electric drive powertrain including a motor and an engine, in accordance with the present disclosure.

FIG. 2 illustrates an exemplary electric drive powertrain 105 including an internal combustion engine 110 functioning as a range extender, a first electric motor 120, a second electric motor 130, a planetary gear set 140, transfer gears 150, 160, and 170, and output shaft 180. Powertrain 105 can be operated in any of a number of configurations based upon selective operation of engine 110 and motors 120 and 130. Further, powertrain 105 includes clutches 132, 134, and 136 which can be engaged or disengaged to change the configuration of the powertrain. Clutch 132 selectively mechanically couples engine 110 to motor 120. Clutch 134 selectively mechanically couples motor 120 to a gear of planetary gear set 140. Clutch 136 selectively grounds the same gear of planetary gear set 140. Transmission output speed sensor 146 monitors a speed of shaft 144 between transfer gears 160 and 170. Damper clutch 138 is between engine 110 and motor 120 to provide a damping or smoothing of the interaction between the engine and the motor.

Motors 120 and 130 can supply torque to powertrain 105. According to one exemplary embodiment, engine 110 is used to provide torque to motor 120 for the purpose of regenerating an energy storage device supplying electrical energy to motors 120 and/or 130. In such a function, supplying torque for a purpose of regeneration rather than supplying torque to the powertrain for the purpose of driving the output shaft, powertrain 105 is referred to as an electric drive powertrain and engine 110 is referred to as a range extender.

Powertrain control can include controlling torque generation based upon an output torque request ($T_{O\_REQ}$) or a desired torque to be delivered to the output shaft of the powertrain. According to one exemplary control method, inputs from an operator are monitored by a control module, for example, including an accelerator pedal position, and the inputs are utilized to generate $T_{O\_REQ}$. Depending upon the particular powertrain, the output torque request can be used by various control modules, including a transmission control module, a hybrid control module, an engine control module, or a motor control module, to command the various components to the powertrain to deliver torque to the output shaft according to the output torque request. Motors of a hybrid drive powertrain or an electric drive powertrain receive torque commands from a control module and operate based upon those torque commands.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In a powertrain utilizing an energy storage device to store electrical energy, a plug-in connection can be utilized to recharge the energy storage device between uses of the powertrain. Use of energy stored as a result of the plug-in connection can be preferable to using energy from other sources such as a fuel tank. In such circumstances, a charge depleting mode can be utilized to ensure that a maximum use of the stored energy is accomplished. In one exemplary embodiment, a charge depleting mode embodied as a fuel cut mode can be commanded, wherein fuel is entirely cut to the engine of the powertrain during a period of operation of the vehicle including when the powertrain provides propelling torque for the vehicle. In such an embodiment, the electrical energy of the energy storage device can be entirely depleted or preferably depleted to some minimum desired state of charge before use of fuel is enabled. Such an embodiment can utilize a measured or estimated state of charge of the energy storage device, compare the state of charge of the battery to a low state of charge threshold, and terminate the fuel cut mode based upon the comparison. Such an embodiment can be commanded immediately when the powertrain is started, such that a full capacity of the energy storage device is always used before fuel is used to extend the operating range of the powertrain. In another embodiment, wherein a planned route of travel is known and travel along the route can be analyzed and operation of the powertrain through the route predicted, a preferred portion or portions of the planned route of travel can be selected for operation of the fuel cut mode. For example, use of the fuel cut mode can be planned for a preferred portion or portions of the travel route wherein use of the motor or motors to solely or in an entirety provide propelling torque to the powertrain is most efficient. In another embodiment, the travel route can be used to operate the powertrain with use of fuel until some calculated point whereat the fuel cut mode can be implemented and only electrical energy can be used to complete the travel route. A number of embodiments for using a fuel cut mode are envisioned, and the disclosure is not intended to be limited to the particular exemplary embodiment provided herein.

In one embodiment, a fuel cut mode can be used within a charge sustaining mode. For example, a hybrid powertrain can implement a charge depleting mode from an initial SOC resulting from a plug-in connection. After the charge depleting mode has run its course, the SOC has reached a minimum desired SOC and the control module switches to a charge sustaining mode with a purpose of maintaining the energy storage device at or within an acceptable range of the minimum desired SOC. However, under certain circumstances, it can still be advantageous for short periods to use a fuel cut mode and provide an entirety of propelling torque to the powertrain from the energy storage device. Under such a charge sustaining mode, the charge used during the brief fuel cut mode must either be anticipated and offset with a bank of charge before the fuel cut mode or made up for after fuel cut mode to return the energy storage device to the minimum desired SOC.

Entry and analysis of a planned route of travel can take a number of embodiments. Use of a GPS device in combination with a digital map database is known in the art and permits planning of a route of travel in detail including road types, speed limits, and presence of traffic signals impacting operation of a vehicle. Traffic patterns, weather, construction, and other factors affecting travel can be monitored in real-time through a wireless connection to a communications network. Additionally or alternatively, operation of the vehicle and patterns of operation of the vehicle can be monitored and determined through repeated operation of the vehicle over time. According to one embodiment, information can be used to estimate energy usage through the planned route of travel in either normal operation or in a fuel cut mode. This usage of energy through various portions of the planned route of travel can be used to pick a preferred portion of the planned route of travel to operate the fuel cut mode. For example, efficiency of using the fuel cut mode through the various portions can be estimated and compared such that a usage based upon a greatest efficiency or a greatest fuel savings can be selected. Alternatively, with a known end point of the planned route of travel, a terminal portion of the planned route of travel can be established as the preferred portion of the planned route of travel—including a beginning point of the preferred portion—to operate the fuel cut mode which meets a desired energy usage.

Output torque can be used to manage operation of a fuel cut mode. Monitored output torque can be a predicted output torque over some span of future travel, a monitored actual output torque or a monitored torque request $T_{O\_REQ}$. A fuel cut mode can be implemented over a portion of a route of travel through which an output torque is predicted and expected to remain within a range that the electric motor or motors can provide or an electric motor torque range. In the event that monitored output torque exceeds a predetermined torque limit for the motor or motors of the powertrain, the fuel cut mode can be suspended or terminated and the engine of a hybrid drive powertrain can be utilized to provide the required extra torque. Suspension of the fuel cut mode can be temporary or permanent. Examples wherein unexpected levels of output torque can be required include tip in events, such as an operator depressing the pedal during a passing event, and deviations from the planned route of travel. Further, in planning the use of the fuel cut mode along a planned route of travel, isolated use of the engine can be planned. For example, if a planned route includes a single incline that is predicted to require more output torque than the motors can provide, the fuel cut mode can be planned to be suspended just before the incline and resumed after the incline. In one embodiment, if increased output torque above a threshold is requested frequently during a fuel cut mode, a hybrid mode can be utilized, emphasizing generation of torque in the motors to deplete the energy storage device but keeping the engine ready to provide torque on demand.

In a configuration wherein an engine in a hybrid drive powertrain can be started on demand to provide torque to the powertrain, a fuel cut mode can be used aggressively, such that the energy remaining in the energy storage device powering the motors is entirely or almost entirely drained at the end of the fuel cut mode. If for some reason the planned route of travel is altered or extended or unexpected traffic congestion is encountered, the balance of the operation to the destination in excess of a range of the motors can be operated with torque from the engine. In a configuration such as an electric drive powertrain, wherein the engine cannot directly provide torque to the powertrain and operation of the engine does not provide enough energy to normally operate the motors of the powertrain, use of a fuel cut mode can be used less aggressively. For example, operation to drain or deplete the energy storage device of an electric drive powertrain can include depleting the energy storage device only to a selected minimum level while leaving some minimum range that can be travelled after the fuel cut mode is complete or terminating the fuel cut mode if the vehicle departs from the planned route of travel, indicating that the route of travel might have changed to include a greater range to the destination than originally planned.

Figure 3:
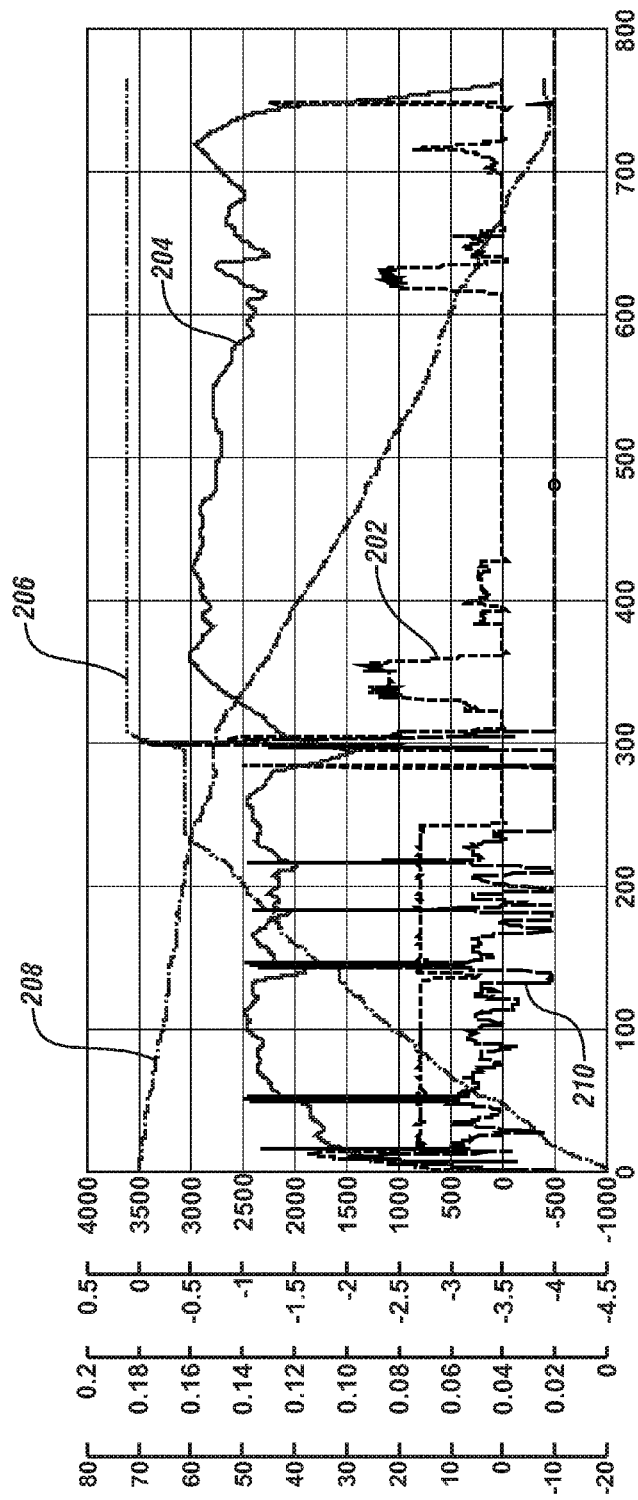
FIG. 3 illustrates operation of an exemplary fuel cut mode, in accordance with the present disclosure.
Figure 4:
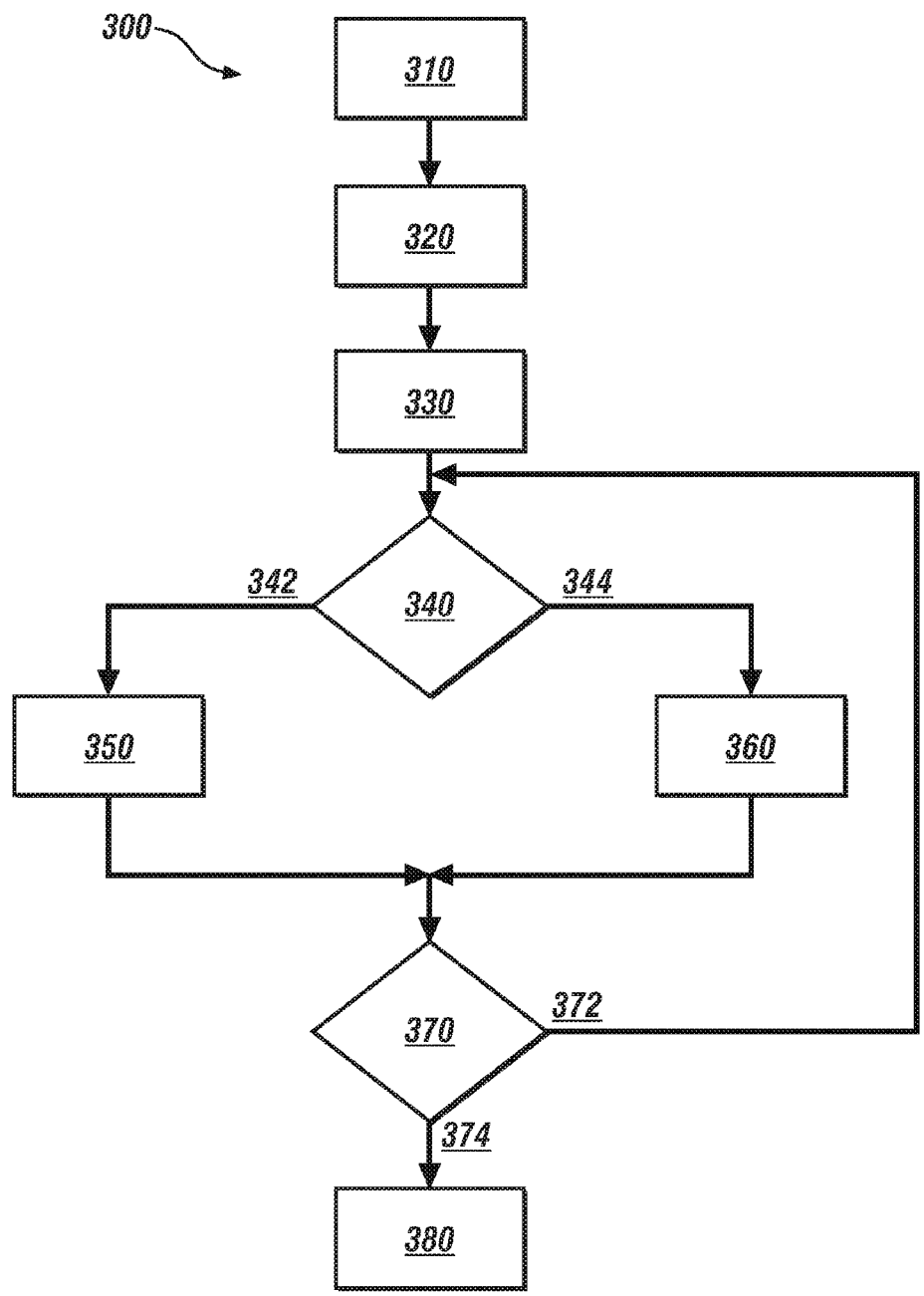
FIG. 4 illustrates an exemplary process to operate a fuel cut mode, providing an entirety of propelling torque to the powertrain with electrical energy from an energy storage device, in accordance with the present disclosure.

FIG. 3 illustrates operation of an exemplary fuel cut mode. FIG. 3 illustrates operation of an exemplary fuel cut mode. The x-axis (horizontal axis) represents a time span of the test data (sec). The y-axis (vertical axis) includes four scales providing values for the illustrated plots. The four scales are, from left to right: vehicle speed in miles per hour, total fuel consumed in kg; state of charge (SOC) in terminal kW-hr, wherein negative values represent charge removed from the energy storage device and positive values represent charge added to the energy storage device; and engine speed in rpm. Additionally, an un-scaled plot illustrating a fuel flow rate 210 is illustrated in FIG. 4. The fuel flow rate on the left side of the figure operates through a range of positive values. In the middle of the figure, the values settle to a fuel flow rate of zero where they remain to the right side of the figure consistent with operation of a fuel cut mode. From initiation of the test at zero seconds to 300 seconds, the powertrain is operated normally, with the engine consuming fuel and with the motors using charge from the energy storage device. Throughout the test time span, the vehicle speed 204 increases and decreases according to a driving through an exemplary travel route. This changing vehicle speed correlates to the associated powertrain accelerating and decelerating through the test time span. At approximately 300 seconds, a fuel cut mode is initiated. The fuel flow rate 210 drops to zero and the total fuel consumed 206 sustains a static value once the fuel cut mode is initiated. The vehicle speed after 300 seconds continues to vary up and down, indicating a period including acceleration of the powertrain resulting in increases to the vehicle speed. Prior to 300 seconds, the SOC of the energy storage device 208 decreases fairly steadily at a first rate. After 300 seconds and the initiation of the fuel cut mode, the SOC of the energy storage device decreases fairly steadily at a second rate, decreasing more rapidly than the first rate. As a result of the initiation of the fuel cut mode, the total fuel consumed that would have continued to increase through the end of the test time span is held constant at the value at the time of initiation of the mode. The engine speed 202 operates normally according to an engine control command prior to 300 seconds. After 300 seconds and the initiation of the fuel cut mode, the engine speed is permitted to vary based upon the engine spinning freely. The engine of a hybrid drive powertrain, in one embodiment, remains connected to a planetary gear set of the powertrain, and based upon torque being transferred through the planetary gear set, a torque can result upon the engine causing the engine to spin at some speed despite the engine being turned off. In the exemplary data of FIG. 3, the engine speed after 300 seconds tends to equal zero, with increases in engine speed in this example being associated with periods of increasing vehicle speed. However, engine speed need not tend to or be maintained to equal zero. Depending upon the particular powertrain configuration, it may be more efficient to configure the operation of the motors to tend to make the engine speed equal to zero, thereby avoiding the inefficiency caused by losses in the spinning engine. In another configuration or in other operational conditions, it may be more efficient to permit the engine to spin than to modify motor operation. Operation of the motors and schemes to control or leave uncontrolled engine speed during a fuel cut mode can be implemented as a result of calibration, modeling, or any other method sufficient to contemplate operation of the powertrain. According to one embodiment, an efficiency of maintaining an engine speed at zero can be determined, an efficiency of permitting the engine to spin freely can be determined, the efficiencies can be compared to determine which is the high efficiency, and the engine speed can be selectively maintained at zero based upon the comparing.

In relation to FIG. 1, engine 14 includes a connection to planetary gear set 24. Depending upon the operation of transmission 10, even if engine 14 is turned off, torque from MG-A 56 can act upon planetary gear set 24. Similarly, torque from MG-B 72 can act upon planetary gear set 24. By balancing torques acting upon planetary gear set 25, a resulting torque of zero can result upon the engine, thereby permitting an engine speed of zero to be maintained while both motors cooperatively provide a propelling torque to the powertrain.

The engine can be permitted to spin freely based upon a balance of the efficiency resulting from permitting the engine to do so. Depending upon how the valves of the engine are operated during the fuel cut mode, it will be appreciated that turning the engine can cause the engine to pump air through the exhaust system. The exhaust system can include a catalyst device that is used to treat an exhaust gas flow during operation of the engine. A catalyst device can require an elevated temperature within the device to operate properly. Methods are known to expend extra fuel when a catalyst is not yet at the required elevated temperatures in order to rapidly bring the catalyst device into desired operation and decrease an initial period of inefficient aftertreatment associated with a cold catalyst. In one embodiment, the spinning engine can force intake air through the exhaust system which cools the catalyst below the normally required elevated temperatures. Operation of the fuel cut mode and a decision whether to permit the engine to spin freely can include a measure of whether the catalyst will need to be reheated before the end of the travel route and whether the efficiency gained by permitting the engine to spin freely outweighs a fuel cost required to reheat the catalyst. In one embodiment wherein the engine will be utilized after the completion of the fuel cut mode, a transition between the fuel cut mode and operation of the engine can be operated based upon a monitored end to the fuel cut mode. This transition can include initially operating the fuel cut mode, maintaining the engine at an engine speed of zero to conserve heat within the catalyst; at some selected brief interval before the end of the fuel cut mode, controlling the motors such that the engine speed increases to some engine starting speed; and then starting operation of the engine.

FIG. 4 in conjunction with Table 1 illustrates an exemplary process to operate a fuel cut mode, providing an entirety of propelling torque to the powertrain with electrical energy from an energy storage device.

TABLE 1

| Step | Description |
| --- | --- |
| 310 | Initiate Fuel Cut Mode |
| 320 | Cease a Fuel Flow to the Engine |
| 330 | Generate Commands Permitting the Engine to Spin Freely |
| 340 | Determine Whether Powertrain Is More Efficient By Controlling Engine Speed to Zero |
| 350 | Operate Powertrain Based Upon $T_{O\_REQ}$ and Maintaining Engine Speed at Zero |
| 360 | Operate Powertrain Based Upon $T_{O\_REQ}$ and Maintaining Engine Speed Greater than Zero |
| 370 | Determine Whether Fuel Cut Mode Remains Active |
| 380 | End Fuel Cut Mode |

Process 300 begins at block 310 with a command to initiate a fuel cut mode. At block 320 fuel flow to the engine is reduced and set to zero or ceased. At this point, any output torque requirements of the powertrain requiring a propelling torque must be delivered by a device other than the engine. At block 330, commands to the engine are generated to the engine to permit the engine to spin with reduced torque. Exemplary commands include commands to open intake and/or exhaust valves to reduce the torque needed to spin the engine. Block 340 determines whether operation of the powertrain can be made more efficient by controlling the engine speed to zero. If block 340 is answered as yes, then arrow 342 is utilized and block 350 operates the powertrain based upon $T_{O\_REQ}$ and maintaining engine speed equal to zero. If block 340 is answered as no, then arrow 344 is utilized and block 360 operates the powertrain based upon $T_{O\_REQ}$ and maintaining the engine speed greater than zero. In some embodiments, the engine is configured to spin only in a forward direction or at a speed greater than or equal to zero. Even if the engine is permitted to spin freely according to the methods disclosed herein, a process can include control of the motors to ensure that torque is not applied to spin the engine in a negative direction. Block 360 includes control to additionally operate the powertrain based upon maintaining engine speed greater than zero. Block 370 determines whether the fuel cut mode remains active. If block 370 is answered as yes, then arrow 372 is utilized returning the process to block 340. If the answer is no, then arrow 374 is utilized, and block 380 ends the process. Process 300 is an exemplary embodiment of how the methods herein can be employed, however a number of embodiments are envisioned, and the disclosure is not intended to be limited to the particular embodiments described herein.

Engine braking is a method including using an engine and the torque required to spin the engine to slow a powertrain or dissipate energy associated with slowing the vehicle. According to one embodiment, an engine of a powertrain operating in fuel cut mode can be used for engine braking. Exemplary operation of a hybrid drive powertrain or electric drive powertrain can include use of the motors of the powertrain in a regeneration mode to provide a torque for slowing the powertrain or dissipating energy associated with a long incline. In regeneration mode, the torque transferred between the motor or motors and the transmission spins the motor or motors, generating electrical energy that is stored in the associated energy storage device. However, such a regeneration mode can be limited or prohibited if the energy storage device for the motor or motors is at or near a maximum SOC to avoid overcharging the energy storage device. By controlling the powertrain in fuel cut mode such that the engine is permitted to spin, the torque transferred between the engine and the transmission can slow the powertrain or dissipate energy from the powertrain. As the powertrain can be controlled to bring the engine speed to zero in some embodiments, the powertrain, when the engine is being used for engine braking, can be controlled to increase the engine speed. An increased engine speed corresponds to a higher torque transferred between the engine and the transmission, thereby increasing the torque available to slow the powertrain or dissipate energy from the powertrain. Referring to FIG. 1, exemplary engine braking can include controlling MG-A 56 and MG-B 72 such that torque from transmission 10 is transferred through planetary gear set 24 to engine 14. Referring to FIG. 2, exemplary engine braking can include engaging clutches 132 and 134 such that torque from the rest of the powertrain is applied to engine 110. When two motors are being used to control the engine speed and little or no charge is desired to be regenerated to the energy storage device, one embodiment can balance regeneration through one motor with energy depletion in the other motor. Additionally, the valve control strategy for the engine can be modulated to increase the torque required to spin the engine, thereby increasing the torque transferred between the engine and the transmission.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling a powertrain comprising an internal combustion engine, a first motor, a second motor, an energy storage device providing electrical energy to the first and second motors, and a plug-in connection, the method comprising:
   providing a planetary gear set within the powertrain, said planetary gear set coupled to the engine, the first motor and the second motor;
   monitoring a fuel cut mode;
   ceasing a fuel flow to the engine based upon the fuel cut mode;
   permitting the engine to spin freely during the fuel cut mode;
   selectively maintaining a zero engine speed comprising balancing a first torque applied to the planetary gear set by the first motor and a second torque applied to the planetary gear set by the second motor; and
   through a period of operation including acceleration of the powertrain, the first motor and the second motor each providing motive torque that cooperatively provide an entirety of propelling torque to the powertrain with the electrical energy from the energy storage device based upon the fuel cut mode.

2. The method of claim 1, further comprising permitting the engine to spin freely in a forward direction during the fuel cut mode.

3. The method of claim 1, wherein providing the entirety of propelling torque to the powertrain comprises maintaining an engine speed at zero.

4. The method of claim 3, further comprising:
   monitoring an end to the fuel cut mode;
   increasing the engine speed with the motor before the monitored end to the fuel cut mode; and
   starting the engine based upon the monitored end to the fuel cut mode.

5. The method of claim 1, further comprising:
   determining a first efficiency associated with maintaining a zero engine speed;
   determining a second efficiency associated with permitting the engine to spin freely; and
   selectively maintaining the zero engine speed based upon a comparison of the first and second efficiencies.

6. The method of claim 5, wherein determining the second efficiency comprises determining a fuel cost to reheat an aftertreatment catalyst.

7. The method of claim 1, further comprising:
   monitoring a state of charge of the energy storage device;
   comparing the monitored state of charge to a low state of charge threshold; and
   terminating the fuel cut mode based upon the comparing.

8. The method of claim 1, further comprising initiating the fuel cut mode immediately when the powertrain is started.

9. The method of claim 1, wherein monitoring the fuel cut mode comprises:
   monitoring a planned route of travel;

determining a preferred portion of the planned route of travel to operate the fuel cut mode; and initiating the fuel cut mode based upon the determined preferred portion of the planned route of travel.

10. The method of claim 9, wherein determining the preferred portion of the planned route of travel comprises determining a portion of the planned route of travel in which the fuel cut mode will result in a greatest fuel savings over the entire planned route of travel.

11. The method of claim 9, wherein determining the preferred portion of the planned route of travel comprises a terminal portion of the planned route of travel.

12. The method of claim 1, further comprising:
monitoring an output torque of the powertrain; and
suspending the fuel cut mode based upon the monitored output torque of the powertrain exceeding a torque limit for the motor.

13. The method of claim 12, wherein monitoring the output torque of the powertrain comprises monitoring an output torque request.

14. The method of claim 12, wherein monitoring the output torque of the powertrain comprises predicting an output torque.

15. The method of claim 12, wherein suspending the fuel cut mode comprises temporarily suspending the fuel cut mode.

16. The method of claim 1, wherein the powertrain comprises an electric drive powertrain and the engine comprises a range extender.

17. The method of claim 1, wherein the powertrain comprises a hybrid drive powertrain wherein the engine and the motor are operable in a powersplit mode.

18. The method of claim 1, further comprising:
monitoring a state of charge of the energy storage device;
comparing the state of charge to a maximum state of charge; and
utilizing engine braking based upon the comparing.

19. The method of claim 18, wherein utilizing engine braking comprises controlling the powertrain to increase an engine speed.

20. The method of claim 19, wherein utilizing engine braking comprises modulating a valve control strategy for the engine to increase a torque required to spin the engine.

21. An apparatus for controlling a powertrain comprising an internal combustion engine, a first motor, a second motor, an energy storage device providing electrical energy to the first and second motors, and a plug-in connection, the apparatus comprising:
a planetary gear set within the powertrain, said planetary gear set coupled to the engine, the first motor and the second motor;
a control module:
monitoring a fuel cut mode;
ceasing a fuel flow to the engine based upon the fuel cut mode;
permitting the engine to spin freely during the fuel cut mode;
selectively maintaining a zero engine speed comprising balancing a first torque applied to the planetary gear set by the first motor and a second torque applied to the planetary gear set by the second motor; and
through a period of operation including acceleration of the powertrain, commanding the first motor and the second motor to each provide motive torque that cooperatively provides an entirety of propelling torque to the powertrain with the electrical energy from the energy storage device based upon the fuel cut mode.

* * * * *